(12) United States Patent
Masters et al.

(10) Patent No.: US 10,404,714 B1
(45) Date of Patent: Sep. 3, 2019

(54) POLICY-MANAGED PHYSICAL ACCESS AUTHENTICATION

(71) Applicant: Schweitzer Engineering Laboratories, Inc., Pullman, WA (US)

(72) Inventors: George W. Masters, Moscow, ID (US); Kylan T. Robinson, Colton, WA (US); Rhett Smith, Kuna, ID (US); Bogdan Z. Kasztenny, Markham (CA)

( * ) Notice: Subject to any disclaimer, the term of this patent is extended or adjusted under 35 U.S.C. 154(b) by 876 days.

(21) Appl. No.: 14/823,201

(22) Filed: Aug. 11, 2015

(51) Int. Cl.
*H04L 29/06* (2006.01)
*H04W 12/06* (2009.01)

(52) U.S. Cl.
CPC .......... *H04L 63/105* (2013.01); *H04L 63/101* (2013.01); *H04W 12/06* (2013.01)

(58) Field of Classification Search
CPC ............. H04L 2463/082; H04L 63/105; H04L 63/101; H04W 12/06
USPC ........................................................ 713/158
See application file for complete search history.

(56) References Cited

U.S. PATENT DOCUMENTS

| | | | |
|---|---|---|---|
| 6,598,161 B1 * | 7/2003 | Kluttz | G06F 21/6209 713/166 |
| 6,738,628 B1 | 5/2004 | McCall | |
| 7,012,503 B2 | 3/2006 | Nielsen | |
| 7,205,882 B2 | 4/2007 | Libin | |
| 7,323,991 B1 | 1/2008 | Eckert | |
| 7,353,396 B2 | 4/2008 | Micali | |
| 7,437,755 B2 * | 10/2008 | Farino | G07C 9/00103 726/12 |
| 7,616,091 B2 | 11/2009 | Libin | |
| 7,848,905 B2 | 12/2010 | Troxler | |
| 8,108,914 B2 | 1/2012 | Hernoud | |
| 8,407,775 B2 | 3/2013 | Conlin | |
| 8,446,249 B2 | 5/2013 | Gerstenkorn | |
| 8,458,770 B2 * | 6/2013 | Olsen | G06F 21/6218 713/155 |

(Continued)

FOREIGN PATENT DOCUMENTS

| | | |
|---|---|---|
| WO | 2010067205 | 6/2010 |
| WO | 2014029774 | 2/2014 |

OTHER PUBLICATIONS

PCT/US2015/038622 Patent Cooperation Treaty, International Search Report and Written Opinion of the International Searching Authority, dated Sep. 30, 2015.

(Continued)

*Primary Examiner* — Dant B Shaifer Harriman
(74) *Attorney, Agent, or Firm* — John P. Davis; Bradley W. Schield

(57) ABSTRACT

Systems and methods are disclosed that provide for physical access management of an access-controlled area of a distributed site of an electric power delivery system using one or more one or more articulated access control policies. In some embodiments, to authenticate rights to access an access-controlled area, a first user may provide an associated access control system with credentials satisfying first authentication requirements based on an applicable policy. In connection with subsequent access authentication requests, the access control system may accept credentials satisfying second authentication requirements that may be different than the first authentication requirements. In this manner, access control requirements to the access-controlled area may be managed based on an associated articulated policy.

18 Claims, 4 Drawing Sheets

(56) References Cited

U.S. PATENT DOCUMENTS

| | | | |
|---|---|---|---|
| 8,482,378 B2 | 7/2013 | Sadighi | |
| 8,494,576 B1 | 7/2013 | Bye | |
| 8,955,076 B1 * | 2/2015 | Faibish | H04L 63/08 |
| | | | 726/7 |
| 8,994,498 B2 | 3/2015 | Kgrafioti | |
| 9,773,363 B2 | 9/2017 | Robinson | |
| 9,779,566 B2 | 10/2017 | Gammel | |
| 2006/0224891 A1 | 10/2006 | Ilac | |
| 2006/0282879 A1 | 12/2006 | Johnson | |
| 2008/0150678 A1 | 6/2008 | Giobbi | |
| 2008/0173709 A1 | 7/2008 | Ghosh | |
| 2009/0085717 A1 | 4/2009 | Kirkjan | |
| 2009/0153290 A1 | 6/2009 | Bierach | |
| 2010/0201230 A1 | 8/2010 | Schweitzer | |
| 2010/0326145 A1 | 12/2010 | Powers | |
| 2012/0077431 A1 | 3/2012 | Fyke | |
| 2012/0208549 A1 | 8/2012 | Lau | |
| 2012/0280790 A1 | 11/2012 | Gerhardt | |
| 2013/0237193 A1 | 9/2013 | Dumas | |
| 2013/0257589 A1 | 10/2013 | Mohiuddin | |
| 2014/0053234 A1 * | 2/2014 | Barton | H04L 67/10 |
| | | | 726/1 |
| 2014/0121858 A1 | 5/2014 | Chen | |
| 2014/0150502 A1 | 6/2014 | Duncan | |
| 2014/0266585 A1 | 9/2014 | Chao | |
| 2014/0331286 A1 * | 11/2014 | Davis | G07C 9/00031 |
| | | | 726/4 |
| 2015/0221152 A1 | 8/2015 | Andersen | |
| 2016/0014103 A1 | 1/2016 | Masters | |
| 2016/0080364 A1 * | 3/2016 | Karimzadeh | G06F 21/34 |
| | | | 726/6 |
| 2016/0117874 A1 | 4/2016 | Daniel-Wayman | |
| 2017/0046890 A1 | 2/2017 | Smith | |
| 2017/0046892 A1 | 2/2017 | Masters | |
| 2017/0046894 A1 | 2/2017 | Robinson | |
| 2017/0046895 A1 | 2/2017 | Gammel | |

OTHER PUBLICATIONS

Robinson et al. "RFID Smart Home: Access Control and Automated-Lighting System", Oct. 23, 2008, pp. iii and 4-17.

* cited by examiner

POLICY-MANAGED PHYSICAL ACCESS AUTHENTICATION

FEDERALLY SPONSORED RESEARCH OR DEVELOPMENT

This invention was made with U.S. Government support under Contract No.: DOE-OE0000680. The U.S. Government may have certain rights in this invention.

TECHNICAL FIELD

This disclosure relates to systems and methods for managing physical access to an access-controlled area and, more particularly, to systems and methods for managing physical access to an access-controlled area of a distributed site of an electric power delivery system in accordance with one or more policies.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
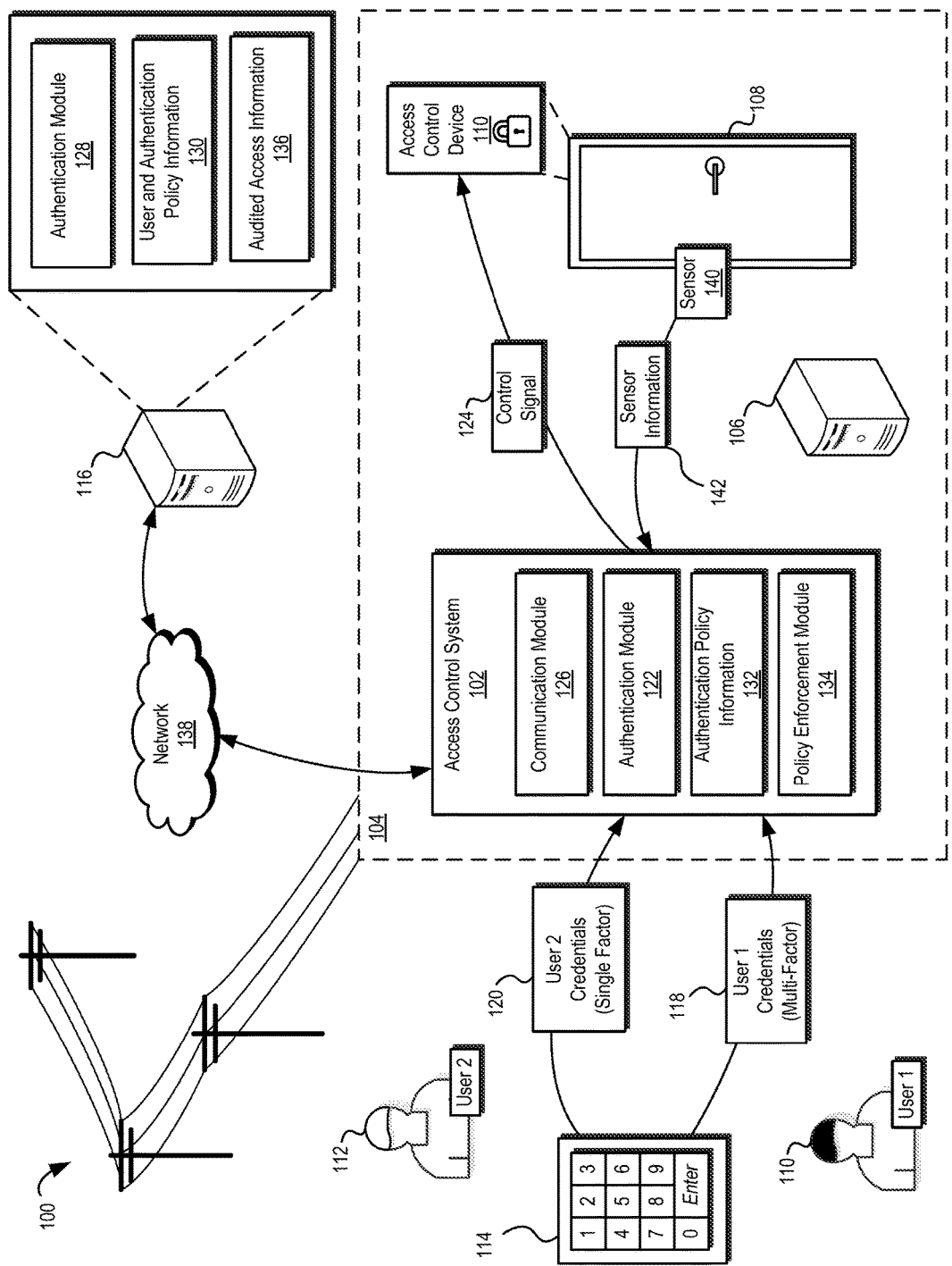
FIG. 1 illustrates an example of a physical access management architecture consistent with embodiments disclosed herein.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Electrical power generation and delivery systems are designed to generate, transmit, and distribute electrical energy to loads. Electrical power generation and delivery systems may include a variety of equipment, such as electrical generators, electrical motors, power transformers, power transmission and distribution lines, circuit breakers, switches, buses, transmission and/or feeder lines, voltage regulators, capacitor banks, and/or the like. Such equipment may be monitored, controlled, automated, and/or protected using intelligent electronic devices ("IEDs") that receive electric power system information from the equipment, make decisions based on the information, and provide monitoring, control, protection, and/or automation outputs to the equipment.

In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers ("PLCs"), programmable automation controllers, input and output modules, governors, exciters, statcom controllers, access control systems, SVC controllers, OLTC controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

Certain equipment associated with an electrical power generation and delivery system may be distributed in one or more sites and/or locations. For example, a variety of equipment (e.g., IEDs, network equipment, and/or the like) may be associated with a distribution substation location of an electric power delivery system. In some circumstances, distributed sites of an electrical power generation and delivery system may be located in relatively remote and/or infrequently accessed locations. For example, certain distributed sites may be accessed infrequently by individuals performing maintenance, diagnostic, and/or repair activities on equipment associated with the sites (e.g., utility and/or other service personnel).

To ensure the physical security of a distributed site and/or associated equipment, a distributed site may include one or more access control devices including, for example, locks (e.g., electromagnetic, mechanical, and/or solenoid locks), tamper protection devices, security-hardened buildings, enclosures, and/or utility boxes, alarm systems, and/or the like. An access control system in communication with the one or more access control devices may be configured to allow personnel wishing to access the distributed site to authenticate their identity and/or their rights to physically access an associated access-controlled area of the distributed site and/or associated equipment. Based on a successful authentication, the access control system may issue one or more control signals to associated physical access control devices configured to allow the personnel physical access to the access-controlled area of the distributed site and/or associated equipment (e.g., by issuing a control signal configured to disengage a solenoid lock, an alarm system, and/or the like). In some embodiments, the access control system and/or associated devices may establish a secure access-controlled boundary associated with the distributed site.

An organization managing a distributed site may wish to manage physical access to an associated access-controlled area based on one or more access rules and/or conditions. In certain embodiments, such rules and/or conditions may be based, at least in part, on an identity, role, and/or other attribute of one or more associated users wishing to gain physical access to the access-controlled area. In further embodiments, the organization may wish to enforce teamwork between one or more users, enforce certain physical presence requirements between one or more users, and/or vary access control authentication methodologies based on an identity, role, and/or attribute of the one or more users and/or other access conditions. In yet further embodiments, an organization may wish to condition physical access based on access time periods (e.g., normal business hours) and/or roles and/or other identity attributes associated with users requesting physical access.

Consistent with embodiments disclosed herein, rules and/or conditions relating to physical access to an access-controlled area of a distributed site may be implemented, at least in part, using one or more articulated access control policies. In certain embodiments, enforcement of such access control policies may be based on an identity, role, and/or other attribute of users wishing to gain physical access to an access-controlled area. For example, to authenticate rights to physically access an access-controlled area, a first user may provide an associated access control system with two types of credentials uniquely identifying the user to the access control system in accordance with a multi-factor (e.g., two-factor) authentication requirement. In accordance with an associated access control policy, the access control system may subsequently accept single-factor authentication (i.e., one type of credential) from one or more second users authenticating their access in a certain period following the authentication of the first user. In this manner, access control requirements to the access-controlled area may be managed based on an associated articulated policy.

Several aspects of the embodiments described herein are illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit ("ASIC"), PAL, PLA, PLD, field programmable gate array ("FPGA"), or any other customizable or programmable device.

FIG. 1 illustrates an example of a physical access management 100 architecture consistent with embodiments disclosed herein. In certain embodiments, an access control system 102 may be associated with an access-controlled area 104 of a distributed site of an electric power generation and delivery system. Consistent with embodiments disclosed herein, the access control system 102 may be configured to manage physical access to the access-controlled area 104 and/or various equipment 106 located within the access-controlled area 104. Although illustrated in connection with an access-controlled area 104 of a distributed site of an electric power generation and delivery system, it will be appreciated that embodiments of the disclosed systems and methods may be utilized in connection with a variety of access-controlled areas.

The access-controlled area 104 may include a variety of equipment 106 associated with the electric power generation and delivery system including, for example, one or more IEDs, network communication equipment, electrical generators, electrical motors, power transformers, power transmission and distribution lines, circuit breakers, switches, buses, transmission and/or feeder lines, voltage regulators, capacitor banks, computer systems, and/or the like. In certain embodiments, the access-controlled area 104 may comprise a subset of equipment 106 associated with a distributed location of an electric power generation and/or delivery system (e.g., a portion of a distribution substation). For example, in some embodiments, the access-controlled area 104 may comprise a distribution substation of an electric power delivery system. In further embodiments, the access-controlled area 104 may comprise a panel and/or utility box housing equipment associated with an electrical power generation and/or delivery system.

Physical access to the access-controlled area 104 and/or equipment 106 associated with the same may be facilitated via one or more access points 108. As illustrated, the access point 108 may comprise a door to a building associated with the access-controlled area 104. In further embodiments, the access point 108 may include one or more panels and/or boxes facilitating access to equipment 106 housed therein. In yet further embodiments, the access point 108 may be associated with a particular piece of equipment (e.g., an IED or the like) within the access-controlled area 104. For example, the access point 108 may comprise an access panel to a particular piece of equipment within the access-controlled area 104.

Physical access by one or more users 110, 112 to the access-controlled area 104 using the one or more access points 108 may be managed by one or more access control devices 110 associated with an access point 108. In certain embodiments, an access control device 110 may be controlled by the access control system 102 in response to one or more control signals. The access control devices 110 may comprise one or more locks (e.g., electromagnetic, mechanical, and/or solenoid locks), alarm systems, and/or the like. For example, in certain embodiments, an access control device 110 may comprise an electronically actuated lock for a door.

In some embodiments, the one or more access points 108 may be associated with one or more sensors 140 providing sensor information 142 to the access control system 102 relating to the access points 108. For example, in some embodiments, the sensors 140 may provide information relating to a status and/or state of an associated access point 108 to the access control system 102 via sensor information 142. In some embodiments, the sensor information 142 may comprise, without limitation, information relating to an open/close status of an access point, occupancy tracking information generated by the access point (e.g., information providing an indication regarding a number of users that have entered the access-controlled area 104 via the access point 108), and/or the like.

The access control system 102, an associated remote authentication service 116 and/or other associated systems (e.g., equipment 106) may comprise any suitable computing system or combination of systems configured to implement embodiments of the systems and methods disclosed herein. In certain embodiments, the access control system 102, the authentication service 116, the equipment 106 and/or other associated systems may comprise at least one processor system configured to execute instructions stored on an associated non-transitory computer-readable storage medium. In some embodiments, the access control system 102, the authentication service 116, the equipment 106 and/or other associated systems may further comprise secure execution space configured to perform sensitive operations such as authentication credential validation, policy management and/or enforcement, and/or other aspects of the systems and methods disclosed herein. The access control system 102, the authentication service 116, the equipment 106 and/or other associated systems may further comprise software and/or hardware configured to enable electronic communication of information between the systems 102, 106, 116 via one or more associated network connections (e.g., network 138).

The access control system 102, the authentication service 116, the equipment 106 and/or other associated systems may comprise a computing device executing one or more applications configured to implement embodiments of the systems and methods disclosed herein. In certain embodiments, the control system 102, the authentication service 116 and/or other associated systems may comprise a laptop computer system, a desktop computer system, an IED, a server computer system and/or any other computing system and/or device that may be utilized in connection with the disclosed systems and methods.

The various systems 102, 106, 116 may communicate via one or more networks comprising any suitable number of networks and/or network connections. For example, as illustrated, the access control system 102 may communicate with the authentication service 116 via network 138. The network connections may comprise a variety of network communication devices and/or channels and may utilize any suitable communication protocols and/or standards facilitating communication between the connected devices and systems. The network connections may comprise the Internet, a local area network, a virtual private network, and/or any other communication network utilizing one or more electronic communication technologies and/or standards (e.g., Ethernet or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may utilize IEEE's 802.11 standards (e.g., Wi-Fi®), Bluetooth®, ultra-wide band ("UWB"), Zigbee®, and/or any other suitable communication protocol(s).

Consistent with embodiments disclosed herein, one or more users 110, 112 may communicate with the access control system 102 via one or more physical access control interfaces 114 (e.g., keypads, buttons, biometric scanners, badge scanners, and/or the like) to authenticate physical access to the access-controlled area 104. In certain embodiments, the interface 114 may comprise a touchscreen, a keyboard, a mouse, a track pad, and/or any other suitable interface associated with the access control system 102. For example, the interface 114 may comprise a physical key and/or electronic 10-digit key pad (e.g., a keypad displayed on a touchscreen interface).

Using one or more interfaces 114 associated with the access control system 102, a user 110, 112 may enter authentication credentials 118, 120 for authenticating their rights to physically access the access-controlled area 104. For example, a user 110, 112 may provide the access control system 102 with authentication credentials 118, 120 such as a personal identification number ("PIN") or the like via a keypad interface 114. The authentication credentials 118, 120 may comprise any type of numeric (e.g., a PIN), alphanumeric, symbolic, and/or other type of authentication credentials. In further embodiments, the authentication credentials may comprise a biometric sensor input, information received from a security key or card in communication with the interface (e.g., using a near field communication ("NFC") standard), and/or the like. It will be appreciated that a variety of types of authentication credentials 118, 120 and associated interfaces 114 may be used in connection with the disclosed embodiments.

After receiving the credentials 118, 120, the access control system 102 may authenticate the validity of the credentials 118, 120 using an authentication module 122 executing thereon to determine whether the user 110, 112 has rights to physically access the access-controlled area 104. The authentication module 122 may comprise software and/or hardware configured to authenticate the validity of the authentication credentials 118, 120 provided to the physical access control system 102, determine whether a user 110, 112 associated with the credentials 118, 120 has current rights to physically access the access-controlled area 104, and/or issue one or more responses and/or control signals 124 in connection with the same.

For example, in certain embodiments, the credential authentication module 122 may compare a PIN included in the authentication credentials 118, 120 with PINs associated with personnel having current access rights to the access-controlled area 104. If the PIN included in the authentication credentials 118, 120 is a PIN associated with personnel having current access rights to the access-controlled area 104, the access control system 102 may issue a control signal 124 to an access control device 110 associated with an access point 108 of the access-controlled area 104. In certain embodiments, the control signal 124 may actuate a lock associated with the access point 108, may disable an alarm system associated with the access point 108, and/or the like. In further embodiments, a response indicating a successful authentication of the authentication credentials may be communicated from the access control system 102 to an associated interface 114 and/or a remote authentication service 116.

In some embodiments, certain aspects of a credential authentication process may involve a remote authentication service 116 communicatively coupled to the access control system 102 (e.g., via and/or network 138). In certain embodiments, communication between the access control system 102 and one or more other systems (e.g., remote authentication service 116, access control device 110, and/or equipment 106) may be facilitated, at least in part, by a communication module 126 executing on the access control system 102. For example, the access control system 102 may communicate authentication credentials 118, 120 provided by users 110, 112 (e.g., via an interface 114 or the like) to the remote authentication service 116. A remote service authentication module 128 may make an authentication decision based on the authentication credentials 118, 120 and/or other user and/or policy information 130 managed by the authentication service 116 (e.g., PINs associated with personnel having access rights). For example, the authentication service 116 may compare a PIN included in the authentication credentials 118, 120 provided by the user 110, 112 with PINs associated with personnel having current access rights to the access-controlled area 104. Based on the results of the determination, the authentication service 116 may communicate a response to the access control system 102 indicating whether the authentication credentials 118, 120 were authenticated by the service 116.

In certain embodiments, the access control system 102 and/or the remote authentication service 116 may implement multi-factor authentication processes (e.g., a two-factor authentication process) in connection with managing physical access to the access-controlled area 104. In certain embodiments, authentication processes consistent with embodiments disclosed herein may include, without limitation, knowledge factor authentication (e.g., demonstrating knowledge of a password, a passphrase, a PIN, a challenge response, a pattern, etc.), ownership or possession factor authentication (e.g., demonstrating possession of a security and/or an identification card, a security token, a hardware token, a software token, a security key, etc.), and/or inherence and/or biometric factor authentication (e.g., providing fingerprint, retina, signature, voice, facial recognition, and/or other biometric identifiers), and/or the like.

Consistent with embodiments disclosed herein, physical access authentication to the access-controlled area 104 may be managed based on one or more access rules and/or conditions. In some embodiments, such access rules and/or conditions may be implemented using one or more articulated policies. Policies may be stored and/or managed by the access control system 102, the remote authentication service 116 and/or any other associated system as part of policy information 130, 132, and may be enforced by a policy enforcement module 134. Among other things, policies may be utilized in connection with enforcing teamwork between one or more users 110, 112, enforce certain physical presence requirements between one or more users 110, 112, vary authentication requirements and/or processes between one or more users 110, 112 (e.g., based on an identity, role, and/or attribute of the one or more users 110, 112), and/or the like. It will be appreciated that a variety of other types of policies may be articulated, and that any type of policy may be utilized in connection with the disclosed embodiments.

Exemplary policies utilized in connection with the disclosed embodiments may comprise, without limitation, identity-based policies, role-based policies, temporal-based policies, and/or condition-based policies. It will be appreciated that in some embodiments, an articulated policy included in policy information 130, 132 may incorporate any suitable combination of identity, attribute, role, temporal, and/or condition-based elements in connection with physical access management consistent with the disclosed embodiments.

In some embodiments, an identity-based policy may associate a particular user with one or more of access authentication processes and/or requirements (e.g., types of access authentication processes and/or the like). For example, an identity-based policy may articulate that when a first user (e.g., "User 1" 110) attempts to gain physical access to the access-controlled area 104, the user 110 may authenticate their access rights using a single-factor authentication process. Similarly, an identity-based policy may articulate that when a second user (e.g., "User 2" 112, which may be a subsequent user) attempts to gain access to the access-controlled area 104, the user 112 may authenticate their access rights using a multi-factor authentication process. In this manner, authentication requirements and/or processes to gain physical access to the access-controlled area 104 may be varied between one or more users 110, 112.

A role-based policy may associate a particular attribute and/or set of attributes associated with a user with one or more access authentication processes and/or requirements. In certain embodiments, such an attribute may comprise, for example, group membership information, user role information (e.g., authorized service technician, seniority, supervisory rights, etc.), organization attribute information, and/or the like. In some embodiments, attribute information may be stored and/or accessed in policy information 132 and/or other user information managed by the access control system 102 and/or in user and/or policy information 130 managed by the authentication service 116. In some embodiments, attribute information may be stored, included in, and/or otherwise be managed using a directory service for managing computing domain networks associated with the user(s) 110, 112 and/or an organization managing the distributed site (e.g., an Active Directory service and/or the like).

As an example, a role-based policy may articulate that when a first user (e.g., "User 1" 110) associated with a first attribute (e.g., a senior technician attribute) authenticates their rights to gain physical access to the access-controlled area 104, the user 110 may be granted access for a first period of time (e.g., 24-hours). Similarly, a role-based policy may articulate that when a second user (e.g., "User 2" 112) associated with a second attribute (e.g., a junior technician attribute) authenticates their rights to gain physical access to the access-controlled area 104, the user 112 may be granted access for a second period of time different than the first period of time (e.g., during normal business hours). In this manner, access to the access-controlled area 104 may be managed based on an identity of an authenticating user. In further embodiments, authentication requirements and/or processes used to gain physical access to the access-controlled area 104 may be varied based on one or more attributes associated with authenticating users 110, 112.

A temporal-based policy may relate one or more access authentication processes and/or requirements to a particular time and/or time period. For example, in some embodiments, a temporal-based policy may specify that physical access to the access-controlled area 104 may be authenticated using a single-factor authentication process during standard working hours, but that outside standard working hours, mutli-factor authentication may be required. In this manner, authentication requirements and/or processes used to gain physical access to the access-controlled area 104 may be varied based on one or more temporal conditions.

A condition-based policy may relate one or more access authentication requirements and/or processes to the satisfaction of one or more conditions. For example, in certain embodiments, a condition-based policy may specify that a user that has not previously authenticated their rights to physically access the access-controlled area be required to engage in a multi-factor authentication process and/or be required to provide a particular type of authentication credential (e.g., a biometric credential and/or the like). In some embodiments, a condition-based policy may, at least in part, be used to enforce certain security requirements associated with a distributed site and/or the access-controlled area 104 (e.g., requirements requiring work within the access-controlled area be performed in teams of two or more people, teams including a supervisor, and/or the like).

In certain embodiments, an access control policy may comprise a combination of identity, attribute, temporal, and/or condition-based elements for use in connection with managing physical access to the access-controlled area 104. For example, an access control policy may specify that for a user associated with a first attribute to be allowed physical access to the access-controlled area (e.g., a guest attribute or the like), another user associated with a second attribute (e.g., an escort attribute or the like) must have authenticated their physical access rights within a certain preceding time period. In this manner, embodiments of the disclosed systems and methods may be utilized to enforce escorted guest requirements in an access-controlled area 104 through enforcement of associated access-control policies by the access control system 102 (e.g., using a policy enforcement module 134 executing thereon and/or the like).

In another example, embodiments of the disclosed systems and methods may be utilized in connection with enforcing and/or allowing certain "piggybacking" activities in connection with authenticating physical access rights to the access-controlled area 104 (e.g., activities where an initial user may authenticate their access in one manner and subsequent users within a typical time period may authenticate their access in another manner). For example, a policy may articulate that an initial user authenticating their rights to physically access the access-controlled area may be required to perform a multi-factor authentication process, while subsequent users authenticating their physical access rights within a certain time period following the initial user may only be required to perform a single-factor authentication process. Accordingly, as illustrated, a first user 110 may provide the access system 102 with two types of credentials 118 uniquely identifying the user 110 in accordance with a multi-factor authentication requirement for authenticating access to the access-controlled area 104. Pursuant to an associated access control policy, the access control system 102 may subsequently accept single-factor authentication (e.g., single-factor authentication credentials 120) from a second user 112 wishing to authenticate their physical access rights to the access-controlled area 104 within a certain time period following the multi-factor authentication of the first user 110.

A variety of other policies may be enforced in connection with embodiments of the disclosed systems and methods including, without limitation, policies relating to escorted access for visitors, fulfillment of certain organizational requirements (e.g., union requirements) such as access hours, escort requirements (e.g., escorts by certified employees for safety and/or trained staff), regional and/or jurisdictional requirements, etc., role and/or conditional requirements including teamwork requirements (e.g., a lead engineer may be allowed to enter an access-controlled area 104 alone, whereas a less senior engineer may be required to authenticate their access in connection with another engineer), temporal and/or conditional requirements (e.g., a technician may be allowed to enter an access-controlled area 104 on a weekend only if they are accompanied by a security officer, and/or the like.

In certain embodiments, data relating to physical access to the access-controlled area 104 may be generated and stored by the access control system 102, the authentication service 116, and/or any other associated system (e.g., stored as audited access information 136 and/or the like). Such audited access information 136 may comprise, without limitation, information regarding which user 110, 112 physically accessed the access-controlled area 104, a time of such access, and/or any other information relating to such access. Among other things, audited access information 136 may be utilized in connection with comprehensive physical and cybersecurity management activities relating to the access-controlled area 104.

It will be appreciated that a number of variations can be made to the architecture and relationships presented in connection with FIG. 1 within the scope of the inventive body of work. For example, without limitation, in some embodiments, some or all of the functions performed by the access control system 102 may be performed by the remote authentication service 116 and/or one or more other associated systems. Similarly, some or all of the functions performed by the remote authentication service 116 may be performed by the access control system 102 and/or one or more other associated systems. In further embodiments, physical access control and resource management consistent with the disclosed embodiments may be implemented in any combination of suitable systems including, for example, all-in-one door controllers. Thus it will be appreciated that the architecture and relationships illustrated in FIG. 1 are provided for purposes of illustration and explanation, and not limitation.

Figure 2:
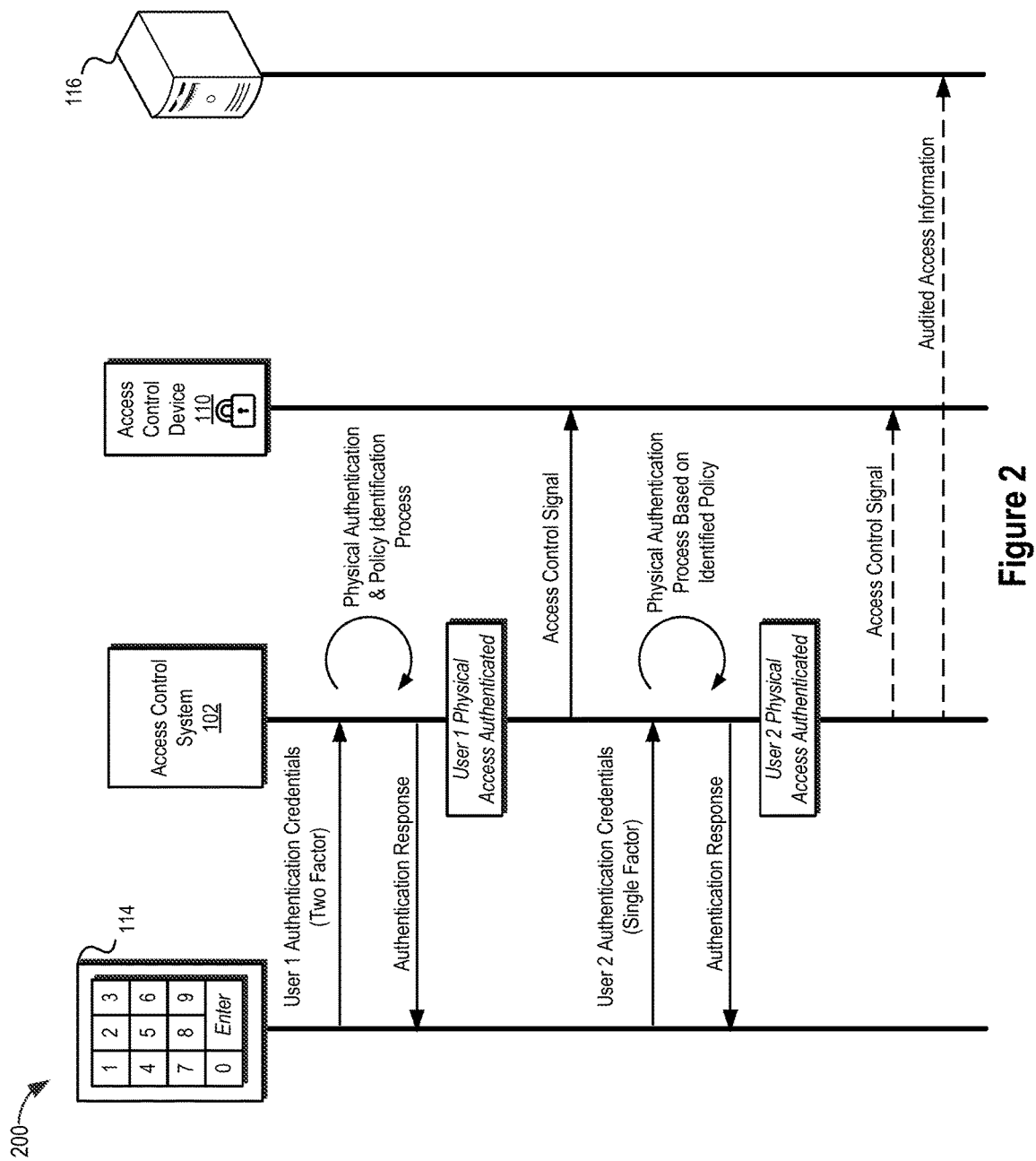
FIG. 2 illustrates a diagram showing an example of a physical access management process consistent with embodiments disclosed herein.

FIG. 2 illustrates a diagram 200 showing an example of a physical access management process consistent with embodiments disclosed herein. The physical access management process may be used to manage physical access to an access-controlled area in accordance with one or more articulated policies. As discussed above, a physical access control interface 114, an access control system 102 associated with the access-controlled area, an access control device 110, and/or a remote authentication service 116 may be utilized in connection with managing physical access to an access-controlled area consistent with embodiments of the disclosed systems and methods.

As illustrated, as part of a physical access authentication process for an access-controlled area, a first user may enter authentication credentials (e.g., a PIN, password, and/or the like) via a physical access control interface 114. In certain embodiments, the credentials provided by the first user may be in accordance with first authentication requirements and/or a first authentication process. For example, as illustrated, the authentication credentials provided by the first user may be in accordance with multi-factor authentication requirements and/or an associated process enforced by the access control system 102. Accordingly, the first user may provide the access control system 102 with a plurality of authentication credentials via one or more physical access control interfaces 110 (e.g., a knowledge-based credential such as a PIN and a possession-based credential such as a keycard and/or information obtained therefrom).

Upon receipt of the authentication credentials, the access control system 102 may perform a physical authentication process based on the authentication credentials and/or the authentication request. For example, the access control system 102 may compare a knowledge-based credential and a possession-based credential provided by the first user with information associated with users having current access rights to the access-controlled area. Based on a successful authentication of the credentials provided to the access control system 102 by the first user, the access control system 102 may authenticate the first user's rights to access the access-controlled area.

In response to a successful authentication of the first user, the access control system 102 may issue one or more control signals to one or more access control devices 110 associated with one or more access points of the access-controlled area. For example, in some embodiments, the access control system 102 may transmit a control signal to actuate an access control device 110 comprising a lock, may disable an alarm of an access control device 110 comprising an alarm system, and/or perform any other action to effectuate an associated access control authentication decision (e.g., a successful authentication decision and/or the like). The access control system 102 may further transmit an indication of the authentication result to an interface associated with the first user (e.g., the physical access control interface 114 or the like).

In some embodiments, in connection with authenticating the first user's rights to access to the access-controlled area, the access control system 102 may engage in a policy identification process. In some embodiments, this policy identification process may be a part of the physical access authentication process described above. For example, in some embodiments, an access authentication policy may be identified based, at least in part, on the credentials provided to the access control system 102 by the first user. In other embodiments, the policy identification process may comprise a separate process.

In some embodiments, the policy identification process may identify a policy for use in connection with the physical authentication process. The policy may articulate one or more rules and/or conditions for allowing the first user access to the access-controlled area. For example, the identified policy may articulate that the first user is required to provide authentication credentials satisfying a multi-factor authentication process prior to being allowed physical access to the access-controlled area. In further embodiments, the identified policy may articulate one or more rules and/or conditions for allowing subsequent user's access to the access-controlled area (e.g., second authentication requirements). For example, the identified policy may articulate that a subsequent user may be allowed physical access to the access-controlled area through satisfaction of a single-factor authentication process.

A second user may subsequently enter authentication credentials (e.g., a PIN, password, and/or the like) via the physical access control interface 114. In certain embodiments, the credentials provided by the second user may be in accordance with second authentication requirements and/or a second authentication process associated with an identified policy. For example, as illustrated, the authentication credentials provided by the second user may be in accordance with single-factor authentication requirements and/or an associated process enforced by the access control system 102. Accordingly, the second user may provide the access control system 102 with a single type of authentication credential via one or more physical access control interfaces 114 (e.g., a possession-based credential such as a keycard and/or information obtained therefrom) to authenticate their physical access to the access-controlled area.

Upon receipt of the authentication credentials from the second user, the access control system 102 may perform a physical authentication process based on the authentication credentials, the authentication request, and/or any applicable policy. Based on a successful authentication of the credentials provided to the access control system 102 by the second user in accordance with the applicable policy, the access control system 102 may authenticate the second user's rights to access the access-controlled area (e.g., transmitting an authentication response and/or one or more control signals to one or more access control devices to effectuate the access control decision). In some embodiments, audited access information relating to the user's interactions with the access control system may be generated and/or transmitted from the access control system 102 to the remote authentication service 116 and/or another service.

Figure 3:
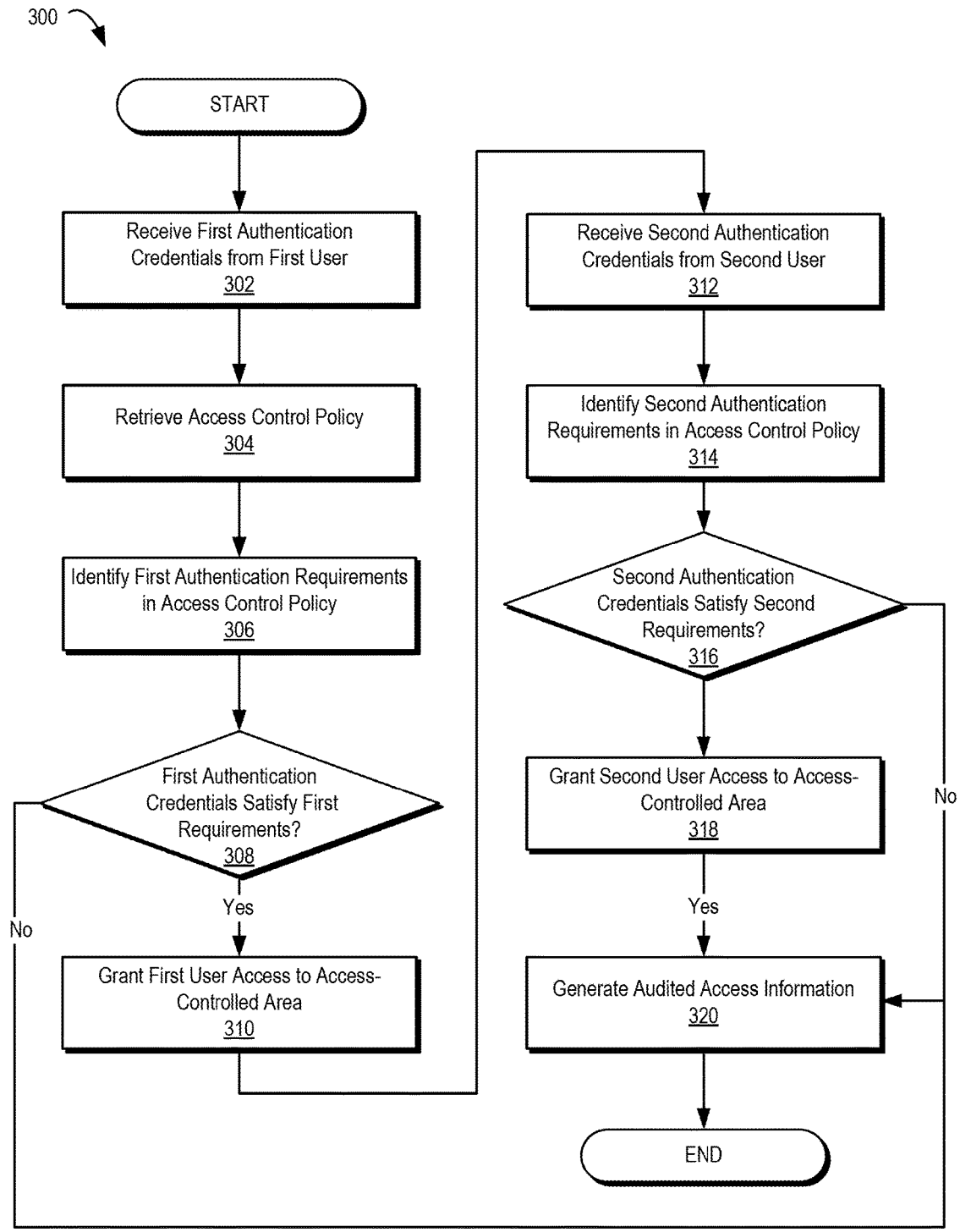
FIG. 3 illustrates a method of managing physical access to an access-controlled area consistent with embodiments disclosed herein.

FIG. 3 illustrates a method 300 of managing physical access to an access-controlled area consistent with embodiments disclosed herein. In certain embodiments, elements of the method 300 may be performed by an access control system associated with a distributed site of an electric power generation and/or delivery system. In further embodiments, elements of the method 300 may be performed by a remote authentication system and/or any other suitable system and/or or combination of systems.

At 302, first authentication credentials may be received by an access control system from a first user (e.g., credentials provided via a physical access control interface). In certain embodiments, the first authentication credentials may comprise any of the types of credentials disclosed herein.

An access control policy may be retrieved at 304. In some embodiments, the access control policy may specify one or more rules and/or conditions for allowing one or more user's access to an associated access-controlled area. For example, the access control policy may articulate one or more authentication requirements and/or processes for allowing physical access to the access-controlled area to one or more users. Consistent with the disclosed embodiments, the access control policy may comprise any suitable combination of identity, attribute, temporal, and/or condition-based elements associated with managing physical access to the access-controlled area.

At 306, a first set of authentication requirements included in the access control policy retrieved at 304 may be identified. The first set of authentication requirements may articulate requirements relating authenticating rights to access the associated access-controlled area. For example, the first set of authentication requirements may specify that the first user may be required to perform a multi-factor authentication process to authenticate their rights to access the access-controlled area and/or specify other aspects of an associated authentication process.

A determination may be made at 308 regarding whether the authentication credentials received at 302 satisfy the first set of authentication requirements. For example, a determination may be made whether the authentication credentials are associated with a user having current physical access rights to the access-controlled site and/or whether the credentials satisfy other authentication requirements (e.g., whether a plurality of types of authentication credentials are provided to satisfy a multi-factor authentication requirement, whether particular types of required authentication credentials are provided, and/or the like). If the first set of authentication requirements are satisfied, the method 300 may proceed to 310, where physical access to the access-controlled area may be granted to the first user (e.g., by generating one or more control signals effectuating the grant of access and/or the like). Otherwise, the method 300 may proceed to 320, where audited access information may be generated.

In certain embodiments, the disclosed systems and methods may be utilized in connection with enforcing and/or allowing certain piggybacking activities in connection with authenticating physical access rights to an access-controlled area with multiple users. That is, embodiments of the disclosed systems and methods may be utilized to streamline and/or allow for different authentication requirements to be utilized by piggybacking users authenticating their physical access rights in a period following the authentication of an initial user.

In connection with such a piggybacking implementation, second authentication credentials may be received by the access control system from a second user at 312 (e.g., via a physical access control interface and/or like). In certain embodiments, the second authentication credentials may comprise any of the types of credentials disclosed herein. In some circumstances, the second user may be a succeeding user to the first user, wishing to gain access to the access-controlled area subsequent to the first user and/or within a particular period of time following the first user.

At 314, a second set of authentication requirements articulating requirements relating to authenticating rights to access the access-controlled area included in the access control policy received at 304 may be identified. In some embodiments, the second set of authentication requirements may be different than the first set of authentication requirements. For example, the second set of authentication requirements may specify that the a user (e.g., the second user) may only be required to perform a single-factor authentication process to authenticate their rights to access the access-controlled area and/or specify other aspects of an associated authentication process, if such a process is performed within a certain period of time following authentication of the first user.

A determination may be made at 316 regarding whether the authentication credentials received at 312 satisfy the second set of authentication requirements. For example, a determination may be made as to whether the authentication credentials are associated with a user having current physical access rights to the access-controlled site and/or whether the credentials satisfy other authentication requirements (e.g., whether the credentials were provided within a certain time period following authentication of the first user and/or the like). If the second set of authentication requirements are satisfied, the method 300 may proceed to 318, where physical access to the access-controlled area may be granted to the first user (e.g., by generating one or more control signals effectuating the grant of access and/or the like). Otherwise, the method 300 may proceed to 320, where audited access information may be generated. In certain embodiments, data relating to physical access to the access-controlled area by the first and/or second users may be generated and stored at 320 (e.g., stored by the access controls system and/or an associated authentication service).

Figure 4:
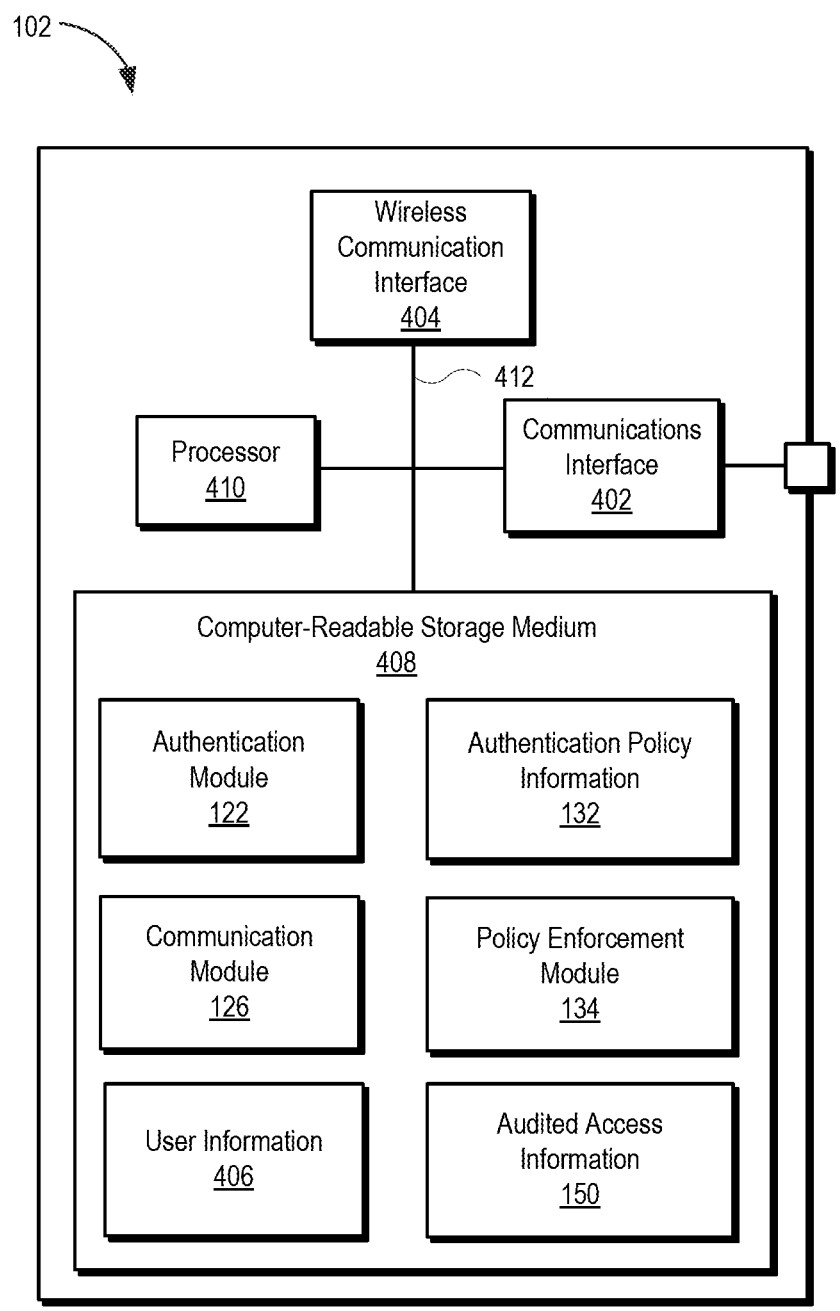
FIG. 4 illustrates a functional block diagram of a resource management system consistent with embodiments disclosed herein.

FIG. 4 illustrates a functional block diagram of an access control system 102 configured to manage one or more resources consistent with embodiments disclosed herein. In some embodiments, the access control system 102 may comprise an IED. Embodiments of the access control system 102 may be utilized to implement embodiments of the systems and methods disclosed herein. For example, the access control system 102 may be configured to manage physical access to an access-controlled area in accordance with one or more access control policies.

The access control system 102 may include a communications interface 402 configured to communicate with a communication network. In certain embodiments, the communications interface 402 may comprise a wired and/or wireless communication interface configured to facilitate communication with a network, other systems and/or devices, and/or mobile devices. For example, in some embodiments, the access control system 102 may be configured to securely communicate with a physical access control interface in connection with receiving authentication credentials from a user, to communicate with devices in connection with issuing access control signals and/or receiving associated status information, and/or the like.

A computer-readable storage medium 408 may be the repository of one or more modules and/or executable instructions configured to implement any of the processes described herein. A data bus 412 may link the communications interface 402, a wireless communication interface 404, and the computer-readable storage medium 408 to a processor 410. The processor 410 may be configured to process communications received via the communications interface 402. The processor 410 may operate using any number of processing rates and architectures. The processor 410 may be configured to perform various algorithms and calculations described herein using computer executable instructions stored on computer-readable storage medium 408.

The computer-readable storage medium 408 may be the repository of one or more modules and/or executable instructions configured to implement certain functions and/or methods described herein. For example, the computer-readable storage medium 408 may include one or more access authentication modules 122 configured to perform embodiments of the physical access authentication methods disclosed herein, and/or one or more policy enforcement modules 134 configured to perform embodiments of the policy identification and/or enforcement methods disclosed herein. The computer-readable medium 408 may further include a communication module 126, policy information 132, user information 406 and/or audited access information 150.

The access authentication module 122 may perform physical access authentication processes consistent with embodiments disclosed herein. For example, as discussed above, in certain embodiments, the access authentication module 122 may implement a knowledge factor-based authentication process (e.g., a PIN authentication process) in connection with authenticating physical access to an access-controlled area of a distributed site. In certain embodiments, the physical access authentication module 122 may utilize authentication information (e.g., authentication credentials associated with individuals having current access rights) managed by the access control system 102 and/or an associated remote system in connection with authentication determination processes.

A policy enforcement module 134 may identify one or more applicable access control policies (e.g., a policy included in policy information 132 or the like) and/or enforce such policy in connection with authentication activities performed by the authentication module 122. For example, consistent with embodiments disclosed herein, the policy enforcement module 134 may identify one or more authentication requirements included in an applicable access control policy for a particular authentication event, and operate with the authentication module 122 to ensure such requirements are satisfied prior to granting physical access to an associated access-controlled area.

A communication module 126 may include instructions for facilitating communication of information from the access control system 102 to other controllers, systems, devices (e.g., access control devices), resources, transient assets and/or other components in the electric power delivery system and/or a distributed site associated with the same. The communication module 126 may include instructions on the formatting of communications according to a predetermined protocol. In certain embodiments, the communication module 126 may be configured to issue one or more control signals to access control devices configured to effectuate a particular access control decision. The communication module 126 may be configured with subscribers to certain information, and may format message headers according to such subscription information.

While specific embodiments and applications of the disclosure have been illustrated and described, it is to be understood that the disclosure is not limited to the precise configurations and components disclosed herein. For example, the systems and methods described herein may be applied to a variety of distributed sites of an electric power generation and delivery system. It will further be appreciated that embodiments of the disclosed systems and methods may be utilized in connection with a variety of systems, devices, and/or applications utilizing physical access control systems and methods, and/or applications that are not associated with and/or are otherwise included in an electric power delivery system. Accordingly, many changes may be made to the details of the above-described embodiments without departing from the underlying principles of this disclosure. The scope of the present invention should, therefore, be determined only by the following claims.

What is claimed is:

1. An access control system associated with an access-controlled area of a distributed site of an electric power delivery system, the system comprising:
   a credential input interface configured to receive first authentication credentials from a first user and second authentication credentials from a second user;
   a communications interface communicatively coupled to an access control device associated with the access-controlled area;
   processing circuitry communicatively coupled to the credential input interface and the communications interface;
   a non-transitory computer-readable storage medium communicatively coupled to the processing circuitry, the computer-readable storage medium storing instructions that when executed by the processing circuitry cause the processing circuitry to:
      retrieve an access control policy, the access control policy comprising first authentication requirements and second authentication requirements, wherein the second authentication requirements have at least one factor of authentication and the second authentication requirements have at least one factor of authentication less than the first authentication requirements when the second authentication credentials are received within a defined period following receipt of the first authentication credentials to enforce a physical presence requirement between the first user and the second user;
      determine that the first authentication credentials satisfy the first authentication requirements;
      send, based on the determination that the first authentication credentials satisfy the first authentication requirements, a first access control signal to cause the access control device to allow the first user physical access to the access-controlled area;
      determine that the second authentication credentials satisfy the second authentication requirements; and
      send, based on the determination that the second authentication credentials satisfy the second authentication requirements, a second access control signal to cause the access control device to allow the second user physical access to the same access-controlled area with the at least one factor of authentication less than the first user while enforcing the physical presence requirement between the first user and the second user.

2. The system of claim 1, wherein the first authentication requirements comprise a multi-factor authentication requirement.

3. The system of claim 1, wherein the second authentication requirements comprise a single-factor authentication requirement.

4. The system of claim 1, wherein the first authentication requirements comprise at least one of an identity requirement, an attribute requirement, a role requirement, a temporal requirement, and a conditional requirement.

5. The system of claim 1, wherein the second authentication requirements comprise at least one of an identity requirement, an attribute requirement, a role requirement, a temporal requirement, and a conditional requirement.

6. The system of claim 1, wherein the first authentication credentials comprise at least one of a personal identification number, a password, a passphrase, a response to a challenge, a pattern, information stored on a card, information stored on a security token, information stored on a hardware token, information stored on a software token, and biometric identification information.

7. The system of claim 1, wherein the second authentication credentials comprise at least one of a personal identification number, a password, a passphrase, a response to a challenge, a pattern, information stored on a card, information stored on a security token, information stored on a hardware token, information stored on a software token, and biometric identification information.

8. The system of claim 1, wherein the access control device comprises at least one of a mechanical lock, an electromechanical lock, and an alarm system.

9. The system of claim 1, wherein the instructions are further configured to cause the processing circuitry to generate audited access information regarding access to the access-controlled area by the first user and the second user.

10. A method for managing physical access to an access-controlled area of a distributed site of an electric power delivery system, the method comprising:
- receiving, via processing circuitry, first authentication credentials from a first user;
- retrieving, via the processing circuitry, an access control policy, the access control policy comprising first authentication requirements and second authentication requirements, wherein the second authentication requirements have at least one factor of authentication, and wherein the second authentication requirements have at least one factor of authentication less than the first authentication requirements when the second authentication requirements are received within a defined period following receipt of the first authentication credentials to enforce a physical presence requirement between the first user and the second user;
- determining, via the processing circuitry, that the first authentication credentials satisfy the first authentication requirements;
- based on the determination that the first authentication credentials satisfy the first authentication requirements, sending, via the processing circuitry, a first access control signal to cause the access control device to allow the first user physical access to the access-controlled area;
- receiving, via the processing circuitry, second authentication credentials from a second user;
- determining, via the processing circuitry, that the second authentication credentials satisfy the second authentication requirements; and
- based on the determination that the second authentication credentials satisfy the second authentication requirements, sending, via the processing circuitry, a second access control signal to cause the access control device to allow the second user physical access to the same access-controlled area with the at least one factor of authentication less than the first user while enforcing the physical presence requirement between the first user and the second user.

11. The method of claim 10, wherein the first authentication requirements comprise a multi-factor authentication requirement.

12. The method of claim 10, wherein the second authentication requirements comprise a single-factor authentication requirement.

13. The method of claim 10, wherein the first authentication requirements comprise at least one of an identity requirement, an attribute requirement, a role requirement, a temporal requirement, and a conditional requirement.

14. The method of claim 10, wherein the second authentication requirements comprise at least one of an identity requirement, an attribute requirement, a role requirement, a temporal requirement, and a conditional requirement.

15. The method of claim 10, wherein the first authentication credentials comprise at least one of a personal identification number, a password, a passphrase, a response to a challenge, a pattern, information stored on a card, information stored on a security token, information stored on a hardware token, information stored on a software token, and biometric identification information.

16. The method of claim 10, wherein the second authentication credentials comprise at least one of a personal identification number, a password, a passphrase, a response to a challenge, a pattern, information stored on a card, information stored on a security token, information stored on a hardware token, information stored on a software token, and biometric identification information.

17. The method of claim 10, wherein the access control device comprises at least one of a mechanical lock, an electromechanical lock, and an alarm system.

18. The method of claim 10, wherein the method further comprises:
- generating audited access information regarding access to the access-controlled area by the first user and the second user.

* * * * *